United States Patent
Tsuyuki et al.

(10) Patent No.: US 6,862,157 B2
(45) Date of Patent: Mar. 1, 2005

(54) MAGNETIC TAPE CARTRIDGE WITH CLAW-ENGAGEABLE SIDE NOTCH HAVING ROUNDED OUTER EDGE WITH SPECIFIED RADIUS OF CURVATURE

(75) Inventors: Seiji Tsuyuki, Kanagawa-ken (JP); Yusuke Ishihara, Kanagawa-ken (JP); Daisuke Takahashi, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 94 days.

(21) Appl. No.: 10/180,064

(22) Filed: Jun. 27, 2002

(65) Prior Publication Data
US 2003/0002215 A1 Jan. 2, 2003

(30) Foreign Application Priority Data
Jun. 29, 2001 (JP) .......................... 2001-199074

(51) Int. Cl.[7] ............................................ G11B 23/107
(52) U.S. Cl. ..................... 360/132; 242/347; 242/348.2
(58) Field of Search .......................... 360/132; 242/347, 242/348, 348.1, 348.2

(56) References Cited

U.S. PATENT DOCUMENTS

| 3,511,449 A | * | 5/1970 | Mathus et al. ............ 242/326.4 |
| 3,940,799 A | * | 2/1976 | Matsumoto et al. ......... 360/132 |
| 5,377,927 A | * | 1/1995 | Erickson et al. ............. 242/346 |
| 6,299,088 B1 | * | 10/2001 | Rambosek ................... 360/132 |
| 6,577,471 B1 | * | 6/2003 | Morita et al. ................ 360/132 |

FOREIGN PATENT DOCUMENTS

WO     WO00/04547 A1  *  1/2000  ......... G11B/23/107

* cited by examiner

*Primary Examiner*—Craig A. Renner
(74) *Attorney, Agent, or Firm*—Sughrue Mion, PLLC

(57) ABSTRACT

The cartridge case of a magnetic tape cartridge is equipped with a side notch, formed in a side wall approximately parallel to an inserting direction of the cartridge case, which is engaged by a locking claw provided in a drive apparatus into which the cartridge case is loaded. The outer edge of the side notch that is contacted by the locking claw is formed into a round edge having a predetermined radius of curvature so that the locking claw does not catch on the side notch.

4 Claims, 5 Drawing Sheets

MAGNETIC TAPE CARTRIDGE WITH CLAW-ENGAGEABLE SIDE NOTCH HAVING ROUNDED OUTER EDGE WITH SPECIFIED RADIUS OF CURVATURE

BACKGROUND OF THE INVENTION

1. Field of the Invention

The present invention relates to a magnetic tape cartridge in which a single tape reel with magnetic tape wound thereon is rotatably housed within a cartridge case.

2. Description of the Related Art

In magnetic tape cartridges, which are in general use as storage media that are employed in external storage units for computers, etc., there is known a type where a single tape reel with magnetic tape wound thereon is rotatably housed within a cartridge case. This magnetic tape is employed to archive data for computers, etc. As important information has been stored, the magnetic tape cartridge is constructed so that problems, such as tape jamming, etc., do not occur and that the magnetic tape is not pulled out of the cartridge case inadvertently.

The magnetic tape has a tape leader pin firmly attached to the leading end thereof. When this magnetic tape cartridge is loaded into a drive apparatus, a leader-pin holding member on the drive apparatus side engages the tape leader pin, pulls out the magnetic tape from the cartridge case, and loads the tape into the drive apparatus. On the other hand, when the magnetic tape cartridge is unloaded from the drive apparatus, the magnetic tape is rewound on the tape reel, and the tape leader pin is returned into the cartridge case by the leader-pin holding member. The cartridge case is formed by fastening upper and lower shells of synthetic resin together with a plurality of small screws. In the vicinity of an opening formed in the upper and lower shells of the cartridge case, the tape leader pin is detachably held at the upper and lower ends thereof by a leader-pin holding spring, etc.

As shown in FIG. 6, the cartridge case is also equipped with a side notch 21, which is formed in the side wall 3b of the lower shell 3. This side notch 21 is open near the front corner, in an insertion direction in which the cartridge case is inserted into the drive apparatus, of the side wall 3b approximately parallel to the insertion direction. The side notch 21 is surrounded by both the inside surface of the side wall 3b on the front side and the outside surface of a connecting rib 22 obliquely extending between the side walls 3b near the front corner.

FIG. 7 shows the state in which the magnetic cartridge is loaded into the drive apparatus. The drive apparatus is equipped with a bucket 40 formed by punching and bending a metal plate. If the magnetic cartridge is loaded into the drive apparatus, the bend portion 41a of the outer end of the locking claw 41 of the bucket 40 contacts elastically with the outer edge 21a of the side notch 21. In this way the magnetic tape cartridge is locked in a predetermined position.

However, since the outer edge 21a in the conventional magnetic tape cartridge is sharply formed, the locking claw 41 of the cartridge driver catches on the sharp edge, when the cartridge is taken out from the cartridge driver. Thus, the conventional cartridge becomes difficult to take out.

The portion of the side notch 21 that contacts with the locking claw 41 can be coated with Teflon™ (fluororesin) to reduce the sliding resistance. However, the Teflon™ coating cracks and peels off after prolonged use, and in that case, the locking claw 41 catches easily on the side notch 21.

In addition, as the construction shown in FIGS. 6 and 7 also has an inner edge 21c at the boundary of the side wall 3b and the front wall of the side notch 21, a locking claw catches on the inner edge 21c, depending on the shape of the locking claw.

SUMMARY OF THE INVENTION

The present invention has been made in view of the circumstances mentioned above. Accordingly, it is the primary object of the present invention to provide a magnetic tape cartridge that is capable of preventing a locking claw from catching on a side notch.

To achieve this end, there is provided a magnetic tape cartridge comprising:

a cartridge case with a side notch, formed in a side wall approximately parallel to an inserting direction of said cartridge case, which is engaged by a locking claw provided in a drive apparatus into which the cartridge case is loaded; and a single tape reel having magnetic tape wound thereon and rotatably housed within the cartridge case;

wherein an outer edge of the side notch that is contacted by the locking claw is formed into a round edge having a predetermined radius of curvature.

It is preferable that a rib is provided which has a flat surface that extends from the outer edge to the interior of the side notch.

According to the present invention, the outer edge of the side notch that is contacted by the locking claw is formed into a round edge having a predetermined radius of curvature. The round outer edge can prevent the locking claw of the cartridge drive from catching on the outer edge.

In addition, the side notch has a rib with a flat surface extending from the outer edge toward the interior of the notch. With this construction, the side notch of the present invention does not have an inner edge that is provided in the conventional side notch.

BRIEF DESCRIPTION OF THE DRAWINGS

The present invention will be described in further detail with reference to the accompanying drawings wherein.

DESCRIPTION OF THE PREFERRED EMBODIMENT

Figure 2:
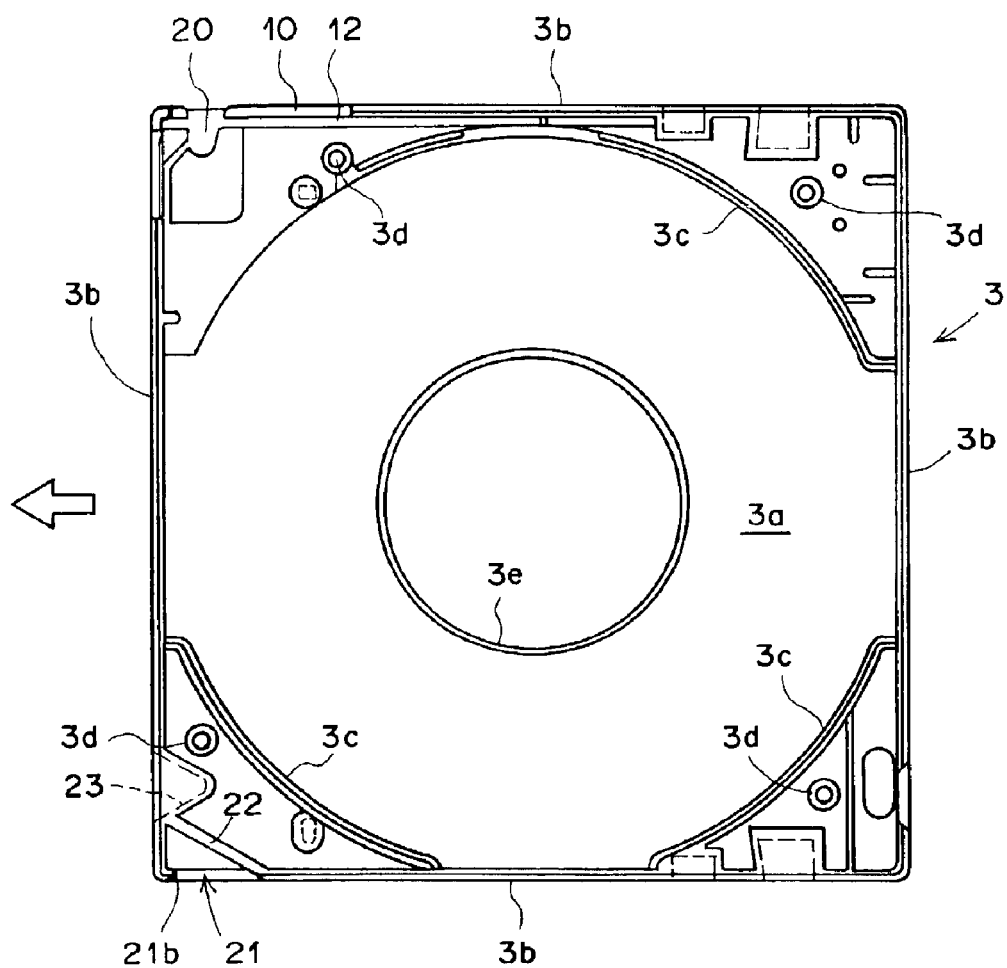
FIG. 2 is a plan view of the lower shell shown in FIG. 1.

A magnetic tape cartridge in a preferred embodiment of the present invention will hereinafter be described in detail with reference to the drawings. Note that the fore-and-aft direction in this specification corresponds to the direction (indicated by an arrow in FIG. 2) in which the magnetic tape cartridge is loaded into a drive apparatus.

Figure 1:
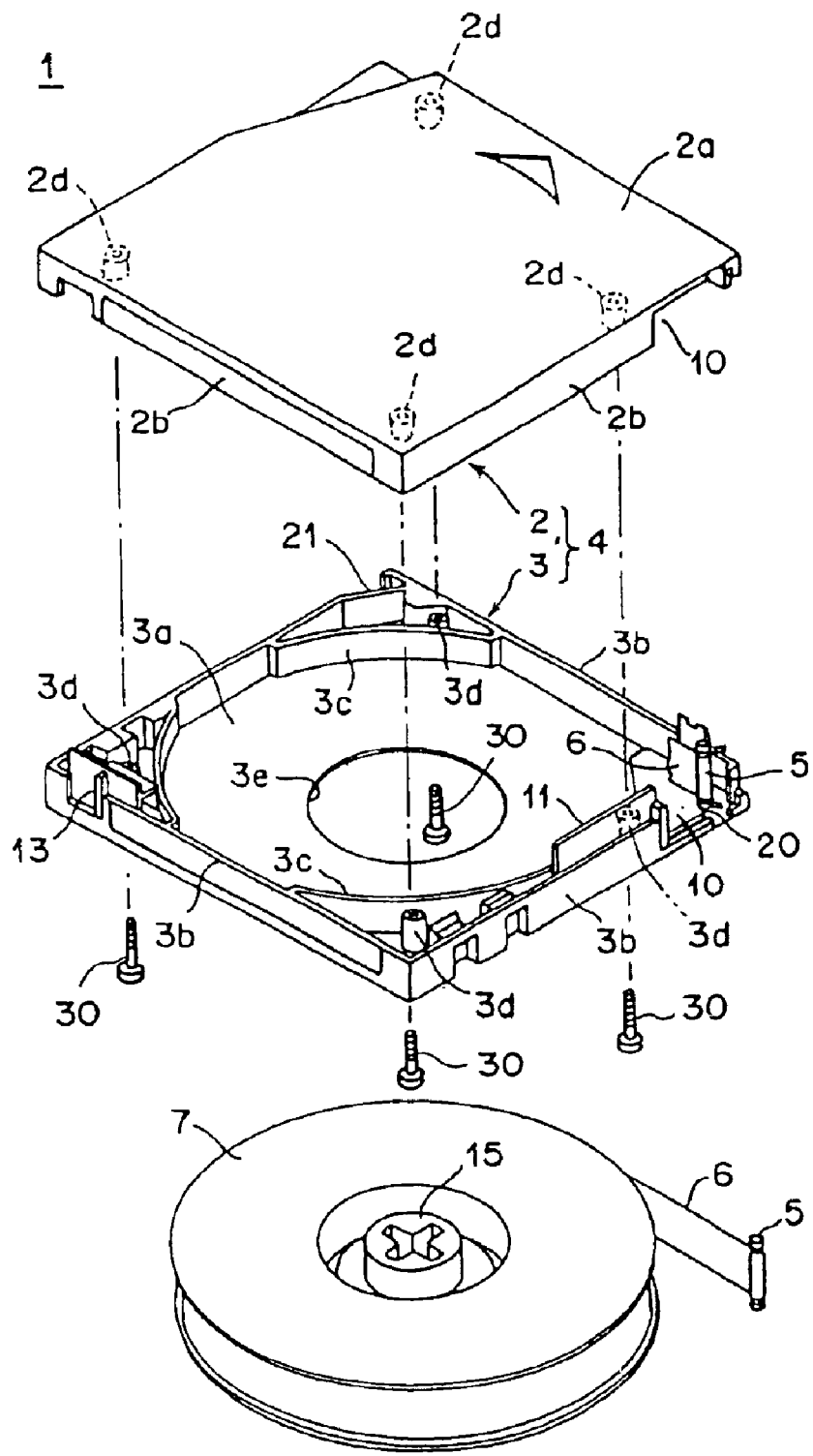
FIG. 1 is an exploded perspective view of a magnetic tape cartridge according to a preferred embodiment of the present invention.

In FIG. 1, the magnetic tape cartridge 1 has a cartridge case 4, which is formed by fastening an upper shell 2 and a lower shell 3 together with four small screws 30. Within the cartridge case 4, a single tape reel 7 with the magnetic tape 6 wound thereon is rotatably housed. The magnetic tape 6 has a tape leader pin 5 firmly attached to the leading end of thereof. The upper and lower shells 2, 3 are substantially square in shape, and are provided with top and bottom walls 2a, 3a and side walls 2b, 3b along the perimeters of the top and bottom walls 2a, 3a. The upper and lower shells 2, 3 are further provided with arcuate inner walls 3c extending along the outer periphery of the tape reel 7. Note that in FIG. 1, only the inner walls 3c of the lower shell 2 are shown. The four boss portions 3d of the lower shell 3, disposed between the side walls 3b and the inner walls 3c, are aligned vertically with the four boss portions 2d of the upper shell 2, respectively. In this state, the upper and lower shells 2, 3 are fastened together by the small screws 30 inserted through the bottom surface of the lower shell 3.

The lower shell 3 has a central aperture 3e at the central portion thereof to enable the tape reel 7 to be rotated by the driving shaft of a drive apparatus (not shown). The cartridge case 4 has a write protector 13 at the rear end portion thereof, the write protector 13 being disposed so that it is slidable. The central portion of the tape reel 7 is provided with a locking mechanism 15 to lock the tape reel 7 in an inoperative state so that the tape reel 7 cannot rotate.

Although not shown, the tape reel 7 has a magnet type reel plate mounted on the central portion of the bottom surface thereof. The reel plate is used to attract and hold the rotation drive means (not shown) of the cartridge drive unit. The radially outer portion of the bottom wall of the tape reel 7 is provided with a reel gear (not shown) which meshes with the driving gear (not shown) of the rotation drive means. Note that if the reel gear and the driving gear mesh with each other, the locking mechanism 15 performs an unlocking operation so that the tape reel 7 can rotate freely.

In the side walls 2b, 3b of the upper and lower shells 2 and 3, an opening 10 is formed and the tape leader pin 5 of the magnetic tape 6 is pulled in and out of the cartridge case 4 through the opening 10. Near this opening 10, there is provided a shutter 11. The shutter 11 is slidable along a shutter rail 12 (see FIG. 2) and is biased in a closed position by a spring (not shown).

When the magnetic tape cartridge 1 is in the inoperative state, the upper and lower ends of the tape leader pin 5 are engaged and held in upper and lower housing recesses 20 formed near the opening 10, with the magnetic tape 6 completely wound on the tape reel 7.

To introduce the magnetic tape 6 into the drive apparatus, the tape leader pin 5 is constructed so that it is pulled out of the opening 10 by the leader-pin holding member of the drive apparatus.

Figure 3:
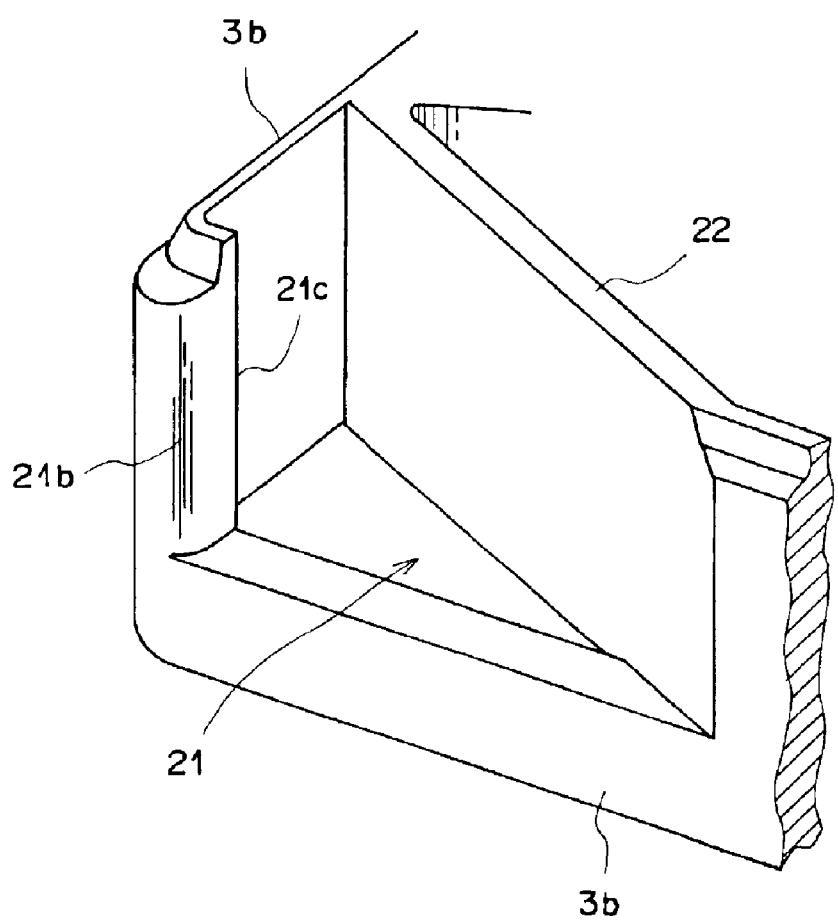
FIG. 3 is a perspective view showing the construction of the side notch of the lower shell.

As shown in FIG. 3, a connecting rib 22 and a side notch 21 are formed in the vicinity of the front corner of the side wall 3b of the lower shell 3 approximately parallel to the insertion direction in which the tape magnetic cartridge 1 is inserted into the drive apparatus. Near the side notch 21, a V-shaped notch 23 for positioning (see FIG. 2) is formed in the side wall 3b on the front side of the lower shell 3.

An outer edge 21b on the front side of the side notch 21 is formed into a round edge having a predetermined radius of curvature (1 mm or less). Thus, the locking claw of the drive apparatus is prevented from catching on the outer edge 21b.

Figure 4:
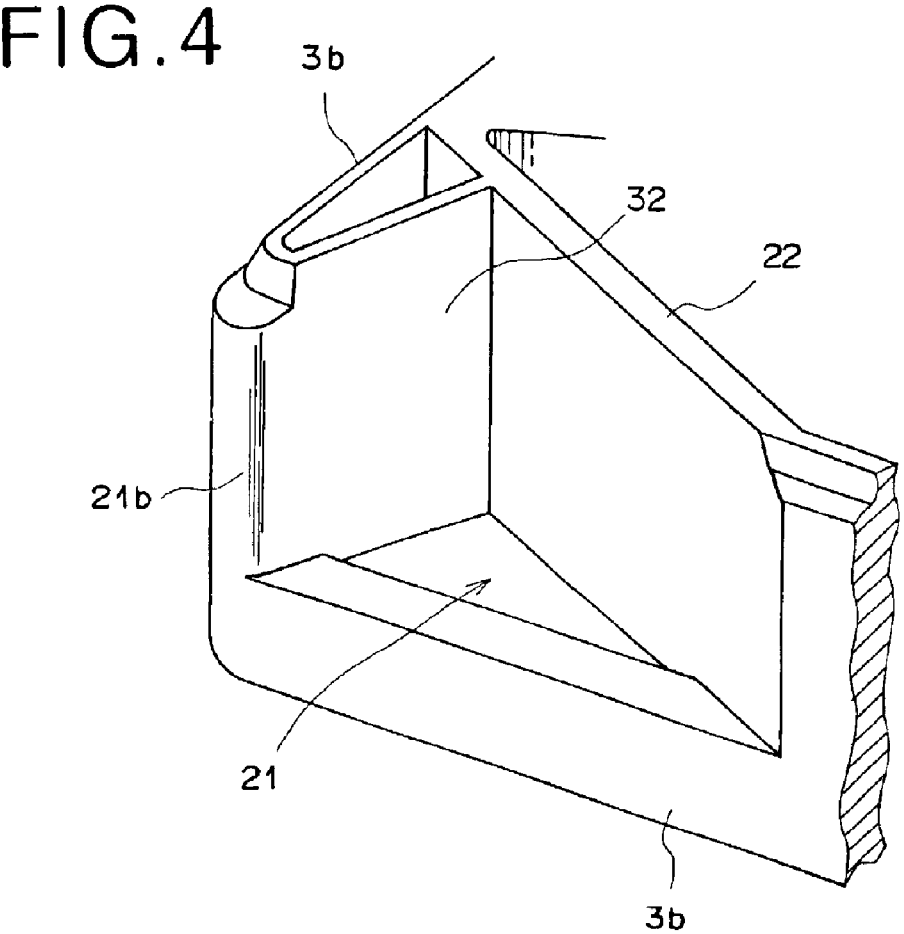
FIG. 4 is a perspective view showing the construction of a side notch having no inner edge.
Figure 5:
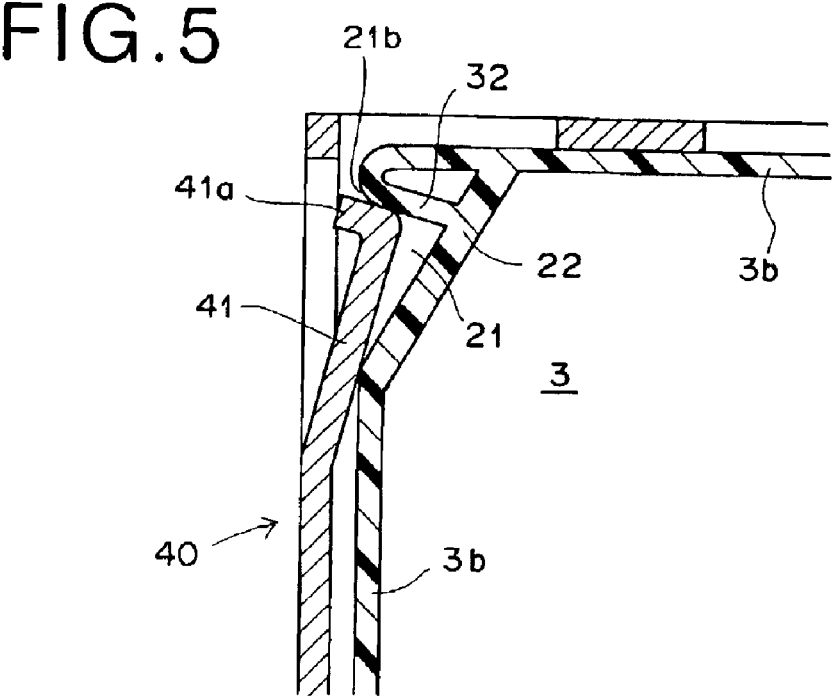
FIG. 5 is a sectional plan view showing the state in which the magnetic tape cartridge with the side notch shown in FIG. 4 is loaded into a drive apparatus.
Figure 6:
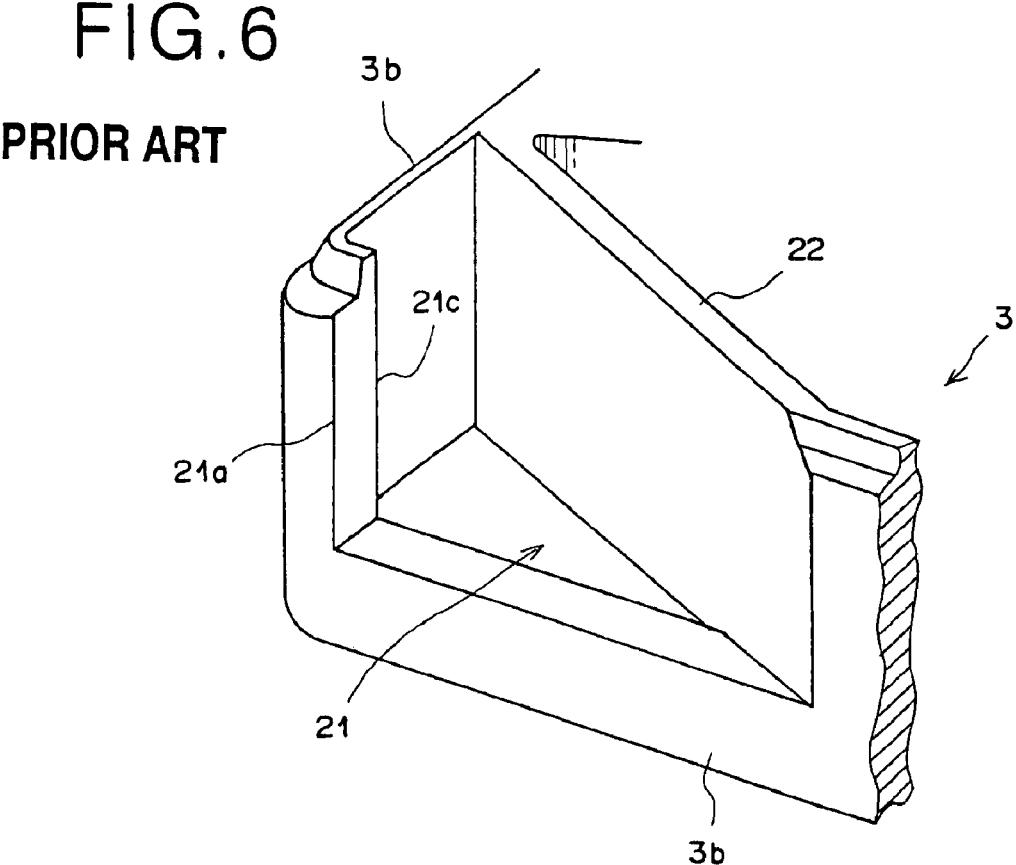
FIG. 6 is a perspective view showing the construction of a side notch formed in a conventional magnetic tape cartridge.
Figure 7:
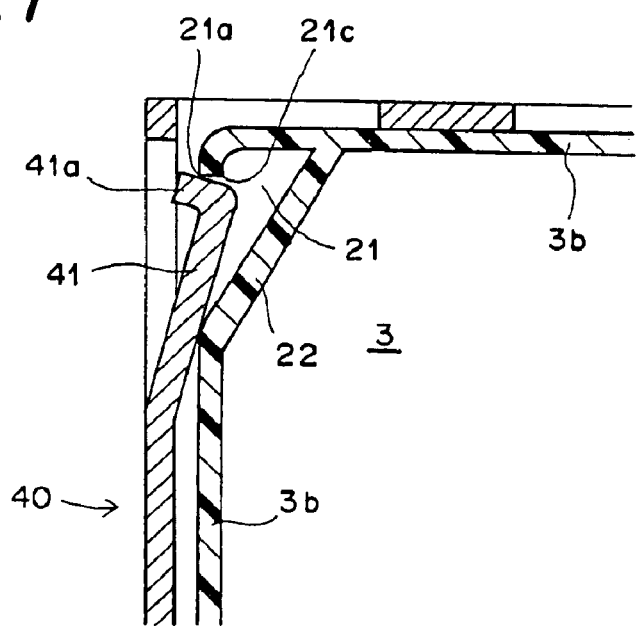
FIG. 7 is a sectional plan view showing the state in which the magnetic tape cartridge with the side notch shown in FIG. 6 is loaded into a drive apparatus.

In FIG. 3, the side notch 21 has the inner edge 21c. However, as shown in FIGS. 4 and 5, the inner edge 21c can be removed by providing a rib 32. The rib 32 extends from the outer edge 21b to the connecting rib 22. In this way the side notch 21 has no inner edge. In this case the aforementioned effect of the present invention is further enhanced. That is, the locking claw is further prevented from catching on the side notch.

While the present invention has been described with reference to the preferred embodiment thereof, the invention is not to be limited to the details given herein, but may be modified within the scope of the invention hereinafter claimed.

What is claimed is:

1. A magnetic tape cartridge comprising:
   a generally flat cartridge case formed by an upper shell and a lower shell, the cartridge case having a side notch, formed in a side wall, which is operative to engage with a locking claw provided in a drive apparatus into which the cartridge case is loaded; and
   a single tape reel having magnetic tape wound thereon and rotatably housed within said cartridge case,
   wherein an outer edge of said side notch, that is engaged by said locking claw, is formed into a round edge having a predetermined radius of curvature,
   wherein the side wall in which the side notch is formed is opposite to a side wall in which an opening is formed for withdrawing the magnetic tape from the cartridge case,
   wherein the radius of curvature of said rounded outer edge is 1 mm or less.

2. A magnetic tape cartridge comprising:
   a cartridge case formed by an upper shell and a lower shell;
   a side notch formed in a side wall at a front side of an insertion direction of the cartridge case, the side notch being operative to engage with a locking claw provided in a drive apparatus into which the cartridge case is loaded; and
   a single tape reel having magnetic tape wound thereon and rotatably housed within said cartridge case;
   wherein an outer edge of said side notch that is engaged by said locking claw is formed into a round edge having a predetermined radius of curvature,
   wherein the radius of curvature of said rounded outer edge is 1 mm or less.

3. A magnetic tape cartridge comprising:
   a generally flat cartridge case formed by an upper shell and a lower shell being secured with screws, the cartridge case having a side notch, formed in a side wall approximately parallel to an insertion direction of said cartridge case, which is operative to engage with a locking claw provided in a drive apparatus into which the cartridge case is loaded; and
   a single tape reel having magnetic tape wound thereon and rotatably housed within said cartridge case;
   wherein an outer edge of said side notch that is engaged by said locking claw is formed into a round edge having a predetermined radius of curvature,
   wherein the radius of curvature of said rounded outer edge is 1 mm or less.

4. A magnetic tape cartridge as set forth in claim 3, wherein said side notch has a rib that forms a flat surface extending from said outer edge toward the interior of said side notch.

* * * * *